United States Patent Office 3,206,465
Patented Sept. 14, 1965

3,206,465
DISULFIDE METHOD OF PREPARING CUPROUS MERCAPTIDES
Walter Reifschneider, Midland, Mich., assignor to The Dow Chemical Company, Midland, Mich., a corporation of Delaware
No Drawing. Filed June 27, 1962, Ser. No. 205,531
9 Claims. (Cl. 260—299)

The present invention is directed to a method of preparing cuprous salts of mercaptans. The term "mercaptan" is used in the present specification and claims to designate an organic compound of the structure

R—S—H wherein R is an aliphatic, heterocyclic, cycloaliphatic, or aromatic group; and a cuprous salt thereof has the formula R—S—Cu Thus the present invention is directed to the preparation of cuprous aliphatic, heterocyclic, or cycloaliphatic mercaptides and cuprous aromatic thiolates of an extreme variety.

According to the present method, an organic disulfide of the formula

R—S—S—R' wherein R' is independently of the same scope as R, is caused to react with metallic copper in liquid reaction medium, and when the reaction does not otherwise go forward promptly, it is catalyzed by a nitrogenous base. The present synthesis is thus represented by the equation $$R-S-S-R' + 2Cu \xrightarrow{(N+)} R-S-Cu + R'-S-Cu$$

Usually and preferably, R and R' will be alike, but this is not essential to the operability of the method.

The method is extremely versatile and can be used in the preparation of products and working from starting materials wherein R is any organic group that can take part in the disulfide structure. Limitations of reaction time and temperature are seldom critical and when they are critical, such limitations can easily be complied with.

The exact weight and identity of nitrogenous base are not critical, any such base being satisfactory and any amount of it producing the desired effect. Ammonia can be used. However, on a laboratory scale, it is usually preferred to employ as nitrogenous base a liquid nitrogenous substance of a boiling temperature suitable as a reaction temperature, whereby to limit the temperature which results from heating. In this way, any reaction temperature within a wide range can be achieved.

When employing liquid nitrogenous base as component of, or in pure form as reaction medium, a pure compound or mixture of pure compounds can be employed to obtain a desired approximate boiling temperature. Available media include the following:

TABLE I

| Liquid nitrogenous base: | Boiling temperature, ° C. |
|---|---|
| Ethylamine | 16.6 |
| Diethylamine | 55.5 |
| Triethylamine | 89.5 |
| Pyridine | 115 |
| 2-picoline | 128 |
| 2,6-lutidine | 142 |
| 3-picoline | 144 |
| 4-picoline | 147 |
| 2,4-lutidine | 157 |
| 3,6-lutidine | 163 |
| 2,4,6-triethylpyridine (γ-collidine) | 172 |
| Ethanolamine | 172.2 |

TABLE I—Continued

| Liquid nitrogenous base: | Boiling temperature, ° C. |
|---|---|
| 4-ethyl-2-methylpyridine (α-collidine) | 179 |
| Aniline | 184.4 |
| 3-ethyl-4-methylpyridine (β-collidine) | 198 |
| Quinoline | 238 |
| Diethanolamine | 268 |

In carrying out the reaction, the disulfide R—S—S—R' is combined with copper and, if desired, nitrogenous base, in liquid reaction medium in any desired amounts and in any sequence or order. Good routine procedures for chemical syntheses are followed, such as vigorous and continuous stirring of the reaction mixture during reaction time, together with heating of the reaction mixture to a temperature at which the reaction goes forward promptly.

The reaction initiates immediately upon the contacting of disulfide and copper, in liquid reaction medium at any temperature over a wide range such as from about 20° to about 350° C. When reactants are combined at room temperature, at least small amounts of product are prepared immediately. When it is desired to carry the reaction to completion with good yield promptly, reaction mixture is usually heated, preferably in the range of 50° to 150° C., whereat reaction goes forward promptly. When reaction does not appear to take place, or proceeds slowly, or requires excess heat, the presence of nitrogenous base which may be a nitrogenous base reaction medium liquid, usually causes it to initiate, or greatly accelerates its progress.

Because the present method is of such wide applicability, compounds of special reactivities may be encountered as starting materials and some of these deserve special mention.

When the starting disulfide contains a plurality of disulfide linkages per nucleus, that is, compounds of the type

R—S—S—R'—S—S—R'' wherein R, R' and R'' are organic groups, the same or different, assuming sufficient amounts of copper, a nucleus such as R' will form a dimercaptide Cu—S—R'—S—Cu as would be expected. This is, in fact, one way in which such di-mercaptide can be formed.

When the starting compounds contain a carbonyl group, reaction temperatures should be kept as low as is convenient.

When the starting disulfide contains one or more sulfonic acid or carboxyl groups, it is preferred to employ a nitrogenous base of sufficient activity that it will form, with the sulfonic or carboxyl group, a salt that will later be returned to acid form as the free mercaptide is purified. This is not usually necessary to a hydroxyl group, as in alcohols and phenols.

When employing compounds susceptible of explosion, temperatures at the low end of the reaction temperature range are employed.

When employing a halogenated aromatic starting disulfide such as $X_n$—R—S—S—R'—$X_n$ wherein R and R' are aromatic and n is an integer up to and including the number of hydrogen atoms one less than those of the unsubstituted group R or R' metallic copper should be very finely divided, reaction temperatures should be relatively low and reaction times as short as will obtain good yield of desired product. This is true because, under the conditions of the present process, a cuprous mercaptide has a tendency to react at the site of an organic substituent halogen to obtain a thioether which may be a polymeric thioether in the nature of a tarry residue. The thioetherification of aromatic halides at most goes forward much more slowly than the reaction to prepare cuprous mercaptide: and by control of temperatures and reaction times, skilled chemists will be able to prepare a desired cuprous salt of halogenated aromatic mercaptan with minimal losses in unwanted reactions.

Such losses tend to be least with chlorinated and fluorinated disulfide starting materials and greatest with iodinated starting materials.

When the starting halogenated disulfide $$X_n\text{—}R\text{—}S\text{—}S\text{—}R'\text{—}X_n$$

is aliphatic, that is, when one or both radicals R and R' is aliphatic in nature, the reaction $$n(X_n\text{—}R\text{—}S\text{—}Cu) + X_n\text{—}R\text{—}S\text{—}Cu$$
$$\rightarrow (X_n\text{—}R\text{—}S)_nR\text{—}S\text{—}Cu + {}_nCuX$$

to prepare a thioether or polythioether compound has at least some tendency to go forward. When X is of high atomic weight and R is of low molecular weight, such reaction may go forward nearly as fast, under some embodiments of the stated conditions, as the reaction $$X_n\text{—}R\text{—}S\text{—}S\text{—}R\text{—}X_n + 2\ Cu \rightarrow 2\ X_n\text{—}R\text{—}S\text{—}Cu$$

(assuming R and R' to be alike) to prepare a cuprous halomercaptide.

In this situation, yield of desired product can be favored in several ways. Firstly, the relative amount of nitrogenous base catalyst can be reduced: as this is done, the rate of both the above reactions is retarded, but the rate of thioether formation is more retarded than is the rate of cuprous mercaptide formation.

The nitrogenous base can be omitted completely, only inert liquid reaction medium being used. The reaction to prepare cuprous salt of haloaliphatic mercaptide then becomes slow, and formation of thioether stops almost completely. When this is desired, suitable solvents include dimethyl formamide and alcohols or mixtures of alcohols chosen for boiling temperatures at which it is desired to carry out the reaction. Some available inert reaction media include:

TABLE II

| Inert liquid medium: | Boiling temperature, ° C., at 760 mm. |
|---|---|
| Methanol | 64.7 |
| Ethanol | 78.3 |
| Benzene | 80.0 |
| Isopropanol | 82.3 |
| n-Propanol | 97.2 |
| Isobutanol | 107.9 |
| Toluene | 111.0 |
| n-Butanol | 117.7 |
| Methyl-Cellosolve (α-hydroxy-β-methoxy ethane) | 125.0 |
| n-Pentanol | 138.0 |
| Mixed xylenes | 140 |
| Dimethyl formamide | 153.0 |
| n-Hexanol | 155.8 |
| Cyclohexanol | 161.5 |
| Octanol-2 | 179.0 |
| n-Octanol | 194.0 |
| Ethylene glycol | 197.5 |
| Benzyl alcohol | 205.4 |
| n-Decanol | 232.9 |
| Glycerol | 290 |

If, under these conditons, formation of desired product stops, or becomes undesirably slow, a small amount of nitrogenous base can be added.

Thus, by judicious control of relative quantity of nitrogenous base in such inert liquid reaction medium as dimethylformamide, an alkanol, and the like, the synthetic chemist desiring to prepare a particular cuprous salt of haloaliphatic mercaptan according to the present invention will be able to obtain desired product in good yield and in satisfactory purity. Thioether and disulfide impurities can be washed away, with solvents, from the relatively insoluble products of the present method.

The temperature at which reaction takes place efficiently is influenced by the nature of the disulfide and reaction medium. It is also heavily influenced by the reactivity of the employed form of copper. In general, copper wire, shot, and sheet react slowly and are not preferred. Copper flakes react much more quickly, especially copper flakes so finely subdivided as to constitute an impalpable powder. Such flakes may be more or less coated with lubricants used in their preparation and their reactivity may be improved by washing the copper well with ether before using it. A so-called "active copper powder" prepared by reduction of a salt solution is especially reactive and, when cost is not a predominant factor, is preferred.

When employing a liquid reaction medium, at least a trace amount of nitrogenous base, active copper powder, and an organic disulfide of at least ordinary reactivity, reaction usually begins at a good rate at, and may usually be completed at room temperature. When employing copper or disulfide or lower reactivity, heating accelerates the reaction. In any case, heating is selom or never needed to drive reaction temperatures above 160° C.

Fortunately, the present method virtually indicates its own progress, so that it can immediately be determined by a chemist at what approximate rate the reaction is taking place, and whether further heating is necessary. The reaction indicates its own progress by the rate of disappearance of metallic copper. Reaction media are in general transparent and the finely divided copper can be seen, usually in motion and suspended in liquid medium, by stirring. As the present reaction consumes copper, its visible abundance in the mixture diminishes. Usually, the copper can be seen to disappear completely, leaving the resulting mixture completely transparent and free of metallic particles. This interval of transparency may be brief: usually, a heavy, even massive, precipitate quickly forms and settles in the resulting mixture.

Thus, while exact temperature and reaction time will depend upon the individual situation, determination of suitable conditions is not difficult.

When employing a haloaliphatic disulfide compound of the sort readily susceptible of undesired side reactions, it is preferred, immediately upon completion of the formation of desired product to quench—that is to say, to dilute with a non-solvent for product, and cool—the reaction mixture promptly, and thereafter also promptly to filter and remove product, and wash and preferably dry the resulting product.

Product mercaptides of the present invention tend to be insoluble in media in which the media fluids and starting materials except copper, are soluble. Hence, when employing copper in an amount that is entirely consumed, product usually forms as the least soluble component of a precipitate and can be recovered by filtration and washed with organic liquid to purify.

When product free of metallic copper is desired, excess copper should be avoided. When employed and it is desired to remove such excess it can be removed by solvent extraction of cuprous mercaptide with a pyridine, or a mono- or dimethyl pyridine solvent. However, this tends to be slow and inefficient. Cuprous mercaptides of molecular weight above about 150 tend to be soluble in benzene or diethyl ether or the like and can be extracted with such solvent from metallic copper. The easiest way to remove excess copper from product cuprous mercaptide is usually to react the copper with further disulfide to obtain further product, and then wash away excess disulfide, using, for example, reaction medium as solvent.

From the foregoing, it is evident that a pure cuprous mercaptide results from the reaction R—S—S—R+2 Cu→2 R—S—Cu when each group represented by R is alike.

When an asymmetrical disulfide is used,

R—S—S—R'+2 Cu→R—S—Cu+R'—S—Cu the separation of R—S—Cu from R'—S—Cu will usually difficult if R and R' are of similar molecular weight or chemical nature. However, when a product of mixed identity is desired, the use of such disulfide may be preferred.

The present mercaptides are highly advantageous intermediates in various syntheses: and the several products resulting from use of an asymmetric disulfide may be used to prepare dissimilar derivatives: in which case separation of the derivatives may be easier than separation of the parent cuprous mercaptides that are products of the present invention.

The following examples, without more, will enable those skilled in the art to practice the present invention.

*Example I*

A reaction mixture is prepared, consisting of 24.0 grams (0.11 mole) phenyldisulfide, 13.0 grams (0.205 mole) active copper powder, 140 milliliters quinoline and 20 milliliters pyridine. The mixture is heated at its reflux temperature (about 150°–200° C.) for an hour. Thereafter, the mixture is permitted to cool to room temperature, filtered and residue is washed with petroleum ether and air dried to obtain, in about 95 percent yield, the cuprous salt of benzenethiol. This compound is a yellow powder: it decomposes when heated to about 285° C. Applied as a dust to young tomato plants it protects them from subsequent inoculation by spores of tomato early blight.

In procedures essentially the same as those foregoing except that reaction temperature is maintained between 125° and 150° C. by use of a picoline reaction medium, there is prepared a cuprous derivative of p-chlorobenzenethiol, from bis-p-chlorophenyldisulfide. The product is an orange powder decomposing above about 300° C. It is an excellent arachnicide. Aqueous dispersions containing a half gram thereof per hundred milliliters of preparation, applied as a spray to lone star tick (a cattle parasite) cause 100 percent kill of the ticks.

Also, from dibenzyldisulfide, in a reaction at about 90° C., there is prepared the cuprous derivative of α-toluenethiol.

Also from dimethyldisulfide, there is obtained the cuprous salt of methyl mercaptan.

From diethyl disulfide, cuprous ethanethiolate as a white powder decomposing at above 260° C.

From di-tertiary butyldisulfide, a golden yellow cuprous derivative of 2-methyl-2-propanethiol melting with decomposition at about 180° C.

From dicyclohexyldisulfide, a tan, powdery cuprous derivative of cyclohexanethiol decomposing at about 300° C.

In preparation of cuprous mercaptides according to the present invention, conditions of a wide range may be used, and no difficulty is encountered when the group represented by R in the disulfide

R—S—S—R'

(which may also be the disulfide

R—S—S—R wherein each R is alike) is, in particular, an aromatic, cycloaliphatic, or aliphatic hydrocarbon group, or an unsubstituted simple or aryl condensed heterocyclic group of which any heteroatom is selected from oxygen, nitrogen, and sulfur: also, when each such particular group contains as substituents only amino, mono- or dialkylamino, alkoxycarbonyl, hydroxy, and alkoxy.

*Example II.—Cuprous-1,2-benzanthryl-10-methylmercaptide*

A reaction mixture is prepared comprising 45.6 grams (0.1 mole) bis - (1,2 - benzanthryl - 10 - methyl)disulfide, (melting with decomposition at 244.5°–245° C.) in vacuum, and prepared according to the method in The Journal of The American Chemical Society, volume 62, pages 2674–81 (1940)), 12.7 grams (0.2 gram atom) copper sponge, dispersed together with stirring in 500 milliliters triethylamine as liquid reaction medium. The resulting mixture is heated, with stirring until the metallic copper disappears, whereupon a dense precipitate forms.

The reacted mixture is diluted with an equal volume of methylcyclohexane, filtered, the filtrate washed with further methylcyclohexane, and vacuum dried. As a result of these procedures there is obtained a cuprous derivative of benz(a)anthracene-7-methanethiol of the formula

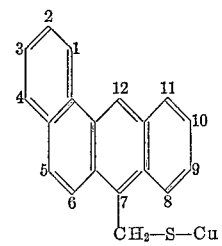

The compound is fungicidal.

Also from bis [(2-amino-4-thiazolyl)methyl] disulfide (white crystals melting at 165.5°–166.5° C.), and metallic copper, an insoluble precipitate of the formula

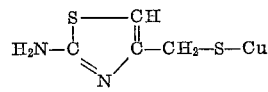

having distinctive fungicidal properties.

From bis(p-acetoxybenzene)disulfide, the S-cuprous salt of p-mercaptophenyl acetate.

From bis(o-diethylaminophenyl)disulfide, the S-cuprous salt of o-diethylamino benzenethiol.

Also, from copper and bis(2,3,5,6-tetramethylphenyl) disulfide (melting at 97°–99° C.) a cuprous 2,3,5,6-tetramethylbenzenethiolate.

From bis(o-methoxyphenyl)disulfide and copper flake, a cuprous o-methoxybenzenethiol.

From bis(p-hydroxyphenyl)disulfide, and active copper powder, an S-cuprous derivative of p-mercaptophenol.

Similarly, other aromatic, aliphatic, cycloaliphatic, and heterocyclic compounds of great variety are prepared.

The active copper powder especially useful in the practice of the present invention is prepared by the reduction of cupric sulfate in aqueous solution as, for example, by the action of zinc. The method is fully described in "Organic Syntheses" (John Wiley, New York, 1948), Collective Volume II, edited by Blatt, page 446.

I claim:
1. Method of preparing a compound of the formula R—S—Cu which comprises causing a reaction between a disulfide compound of the formula R—S—S—R' and metallic copper, in a liquid reaction medium, wherein each of R and R' is an organic radical.
2. Method of claim 1 wherein the liquid reaction medium is an inert liquid.
3. Method of claim 1 wherein the liquid reaction medium comprises a nitrogenous base.
4. Method of claim 1 wherein R is an aliphatic group.
5. Method of claim 1 wherein R and R' are identical.
6. Method of claim 3 wherein the metallic copper is supplied to the reaction mixture in an amount not greater than that amount stoichiometric with disulfide compound.

7. Method of claim 3 wherein R represents an aromatic radical.

8. Method of claim 3 wherein R represents a heterocyclic group.

9. Method of claim 4 wherein the disulfide compound and copper are combined with reaction medium at a temperature in the range of from 20° to 220° C. with stirring and maintained under these conditions until metallic copper disappears.

References Cited by the Examiner

Kharasch: Organic Sulfur Compounds, vol. 1 (New York, 1961), pages 84–90.

NICHOLAS S. RIZZO, *Primary Examiner.*